United States Patent
Croxford et al.

(10) Patent No.: US 10,984,758 B1
(45) Date of Patent: Apr. 20, 2021

(54) IMAGE ENHANCEMENT

(71) Applicants: Apical Limited, Cambridge (GB); Arm Limited, Cambridge (GB)

(72) Inventors: Daren Croxford, Swaffham Prior (GB); Jayavarapu Srinivasa Rao, Cambridge (GB)

(73) Assignee: Apical Limited and Arm Limited, Cambridge (GB)

( * ) Notice: Subject to any disclaimer, the term of this patent is extended or adjusted under 35 U.S.C. 154(b) by 0 days.

(21) Appl. No.: 16/696,400

(22) Filed: Nov. 26, 2019

(51) Int. Cl.
*G06T 17/00* (2006.01)
*G09G 5/373* (2006.01)
*G06F 3/01* (2006.01)

(52) U.S. Cl.
CPC .............. *G09G 5/373* (2013.01); *G06F 3/013* (2013.01); *G09G 2320/0261* (2013.01); *G09G 2340/02* (2013.01); *G09G 2340/0407* (2013.01); *G09G 2350/00* (2013.01); *G09G 2354/00* (2013.01); *G09G 2370/00* (2013.01)

(58) Field of Classification Search
CPC .... H04N 19/176; H04N 19/186; H04N 19/17; H04N 5/355; H04N 9/646; G06T 2207/20072; G06T 3/4046; G06T 3/4053
See application file for complete search history.

(56) References Cited

U.S. PATENT DOCUMENTS

| 9,805,478 | B2 | 10/2017 | Croxford et al. |
| 10,580,117 | B2 * | 3/2020 | Chen .................... G06T 11/001 |
| 2017/0200304 | A1 * | 7/2017 | Li ........................... G06F 3/017 |
| 2017/0364461 | A1 | 12/2017 | Croxford et al. |

FOREIGN PATENT DOCUMENTS

GB  2544358 A  5/2017

OTHER PUBLICATIONS

Kim et al., "Accurate Image Super-Resolution Using Very Deep Convolutional Networks", 2016 IEEE Conference on Computer Vision and Pattern Recognition (CVPR).
Kendall et al., "Essentials of DisplayPort Display Stream Compression (DSC) Protocols", Teledyne LeCroy webinar, Feb. 2018.

\* cited by examiner

*Primary Examiner* — Weiming He
(74) *Attorney, Agent, or Firm* — EIP US LLP (57) ABSTRACT

A display controller configured to process first data representative of a first portion of an input frame to process the first portion of the input frame using an image enhancement scheme, thereby generating first enhanced data. The first enhanced data is sent to a display interface for sending to a display device. Subsequently, further data is sent to the display interface for sending to the display device. The further data is associated with at least one further portion of the input frame, each of which is different from the first portion of the input frame. The display controller is further configured to send instructions to the display interface for sending to the display device to instruct the display device to display an output frame comprising a first portion represented by the first enhanced data and at least one further portion represented by the further data.

20 Claims, 4 Drawing Sheets

IMAGE ENHANCEMENT

BACKGROUND OF THE INVENTION

Field of the Invention

The present invention relates to methods and apparatus for image enhancement.

Description of the Related Technology

The resolution of display devices has been increasing rapidly, with high resolution display devices now available for televisions, computer monitors and some smartphones, among other devices. A large amount of video content has, however, been recorded at a resolution that is lower than the resolution of current display devices. Furthermore, graphics processing systems of various computing devices such as smartphones and tablets may be configured to render graphics at a lower resolution to reduce graphics processing requirements. In addition, a lot of video content has been encoded according to the Rec. 601 standard, with a limited dynamic range and limited colors. More recently, high dynamic range (HDR) video content has been encoded with later standards such as the Rec. 709 and Rec. 2020 standards, with a wider dynamic range and a broader range of colors.

Various image processing techniques may be used to enhance the quality of an image. For example, there are a number of upscaling schemes for increasing the resolution of images for display by a display device, typically by increasing the number of pixels of an image. As an example, upscaling schemes based on pixel replication involve the generation of additional pixels with values that are based on the pixel values of the lower-resolution image. Another known technique for increasing the resolution of an image is super-resolution image processing, which may involve the use of machine learning techniques such as neural networks. Super-resolution image processing typically provides superior quality images compared to those generated using pixel replication. It is also known to enhance an image by increasing a dynamic range of the image or a range of colors of the image. Image processing methods to produce a higher quality frame with a desired visual quality may, however, be resource intensive.

SUMMARY

According to a first aspect of the present disclosure, there is provided a display controller configured to: process first data representative of a first portion of an input frame to process the first portion of the input frame using an image enhancement scheme, thereby generating first enhanced data; send the first enhanced data to a display interface for sending to a display device; and subsequently, send further data to the display interface for sending to the display device, wherein the further data is associated with at least one further portion of the input frame, and each of the at least one further portion is different from the first portion of the input frame, wherein the display controller is further configured to send instructions to the display interface for sending to the display device to instruct the display device to display an output frame comprising a first portion represented by the first enhanced data and at least one further portion represented by the further data.

According to a second aspect of the present disclosure, there is provided a method comprising: processing first data representative of a first portion of an input frame to process the first portion of the input frame using an image enhancement scheme, thereby generating first enhanced data; sending the first enhanced data to a display interface for sending to a display device; subsequently, sending further data to the display interface for sending to the display device, wherein the further data is associated with at least one further portion of the input frame, and each of the at least one further portion is different from the first portion of the input frame; and sending instructions to the display interface for sending to the display device to instruct the display device to display an output frame comprising a first portion represented by the first enhanced data and at least one further portion represented by the further data.

Further features will become apparent from the following description, given by way of example only, which is made with reference to the accompanying drawings.

DETAILED DESCRIPTION OF CERTAIN INVENTIVE EMBODIMENTS

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

In examples herein, first data representative of a first portion of an input frame is processed using an image enhancement scheme to generate first enhanced data, and the first enhanced data is sent to a display interface. The image enhancement scheme may be any suitable image processing scheme for enhancing at least one characteristic of the input frame, such as a resolution, dynamic range and/or color range of the input frame. For example, the image enhancement scheme may be SR image processing. SR image processing may be used to increase the resolution of an image, such as a portion of a frame. Detail in the portion of the frame may hence be increased, which may reduce the appearance of blurring or lack of clarity in the portion of the frame. SR image processing may be considered to be a particular class of image upscaling involving the use of machine learning techniques, such as the use of an artificial neural network (sometimes referred to merely as a neural network). For example, SR image processing may be referred to as machine learning (ML) SR image processing. In some cases, a deep learning (DL) ML algorithm may be used, which uses multiple layers to progressively extract higher level features from input data. In such cases, the SR image processing may be referred to as DL SR. DL SR for example generates new pixels from the DL system's knowledge of objects (as the DL system has typically been trained using images of various different objects). In this way, the DL system can intelligently fill in missing pixels in a higher resolution version of the input frame. For example, if the first portion of the input frame includes an image of a cat, the DL system may generate pixel values that accurately replicate the texture of cat fur, thereby generating the first enhanced data. In other examples, the image enhancement scheme may be or include other upscaling schemes that do not involve SR image processing, such as those that do not involve machine learning. For example, interpolation processes involving averaging over pixel values to estimate the values for newly generated pixels (to increase resolution) are not considered to include SR image processing. SR image processing tends to provide improved image quality compared to other upscaling techniques. However, SR image processing is generally more computationally and resource intensive.

In other examples, the image enhancement scheme increases the dynamic range of the input frame. The dynamic range of the input frame for example refers to a ratio between the brightest and darkest pixel intensities of the pixels of the input frame. In yet further examples, the image enhancement scheme increases the range of colors of the input frame. Various different approaches may be used to increase the dynamic range and/or color range of the input frame. In some cases, the image enhancement scheme may enhance multiple characteristics of the input frame, such as increasing both a dynamic range and a color range of the input frame. As an example, the input frame may be processed using a neural network trained to broaden the dynamic range and color range of input images. For example, such a neural network, which may be a DL network, may be able to detect a particular object in a standard definition (SD) input frame. The neural network may then be able to convert that particular object into a high definition (HD) version, with a wider dynamic range and color range. In other cases, a similar neural network may be trained to perform one of dynamic range enhancement or color range enhancement, without performing the other.

In examples, the image enhancement scheme performs tone mapping of the input frame, to increase the quality of the input frame. Tone mapping typically aims to enhance detail or contrast in the input frame, while still ensuring the input frame appears relatively "natural" to an observer. To do this, the tone mapping may be asymmetric in the brightness domain, such that a greater amount of tone mapping is applied to dark regions of the input frame than relatively bright regions, for example by altering an intensity value of relatively dark portions of the input frame to a greater extent than relatively bright portions. This mimics the behavior of the human eye, which has a relatively high dynamic range, and which is capable of seeing detail in even relatively dark regions of an input frame. The tone mapping may therefore involve adjusting the dynamic range of the input frame. Adjusting the dynamic range in this way typically enhances detail in dark and/or light areas of the input frame and reduces detail in mid-tone areas so as to render visible detail that would otherwise be lost in bright or shaded areas of the input frame while still maintaining a natural look of the input frame to the observer. Various different tone mapping algorithms may be used for the tone mapping operation. For example, the input frame may be processed using an appropriately trained neural network, which may be a DL neural network, to perform the tone mapping.

The first enhanced data generated by the image enhancement scheme typically has higher storage requirements than the first portion of the input frame prior to processing the first portion of the input frame using the image enhancement scheme. Storage of the first enhanced data may therefore be more memory intensive than storage of the first portion of the input frame. Similarly, transfer of the first enhanced data between various components of a computing system may use more memory bandwidth than transferring the first portion of the input frame. However, the memory size and bandwidth requirements associated with the first enhanced data may nevertheless be more manageable than if the image enhancement scheme is applied to the entirety of the input frame in a single pass. On this basis, by using the image enhancement scheme for the first portion of the input frame, processing and memory usage may be reduced compared to performing image enhancement scheme of the entire input frame at once.

Subsequently, further data associated with at least one further portion of the input frame is sent to the display interface for sending to the display device. Each of the at least one further portion of the input frame is different, respectively, from the first portion of the input frame that is sent to the display interface. Instructions are sent to the display interface for sending to a display device to instruct the display device to display an output frame comprising a first portion represented by the first enhanced data and at least one further portion represented by the further data. As the first enhanced data and the further data are each associated with a respective sub-portion of the input frame, generating the first enhanced data and sending the first enhanced data to the display interface before sending the further data to the display interface may be more resource efficient than processing an entirety of the input frame and/or reading an entire input frame into or out of storage. For example, the input frame may be processed and sent to the display interface in a piecewise fashion. The display interface may also send the processed portions of the input frame to the display device for display in a similarly piecewise manner, which may reduce memory bandwidth compared to sending an entire frame to the display device. In this way, the memory bandwidth may be used efficiently, without an underrun, as discussed further below.

Figure 1:
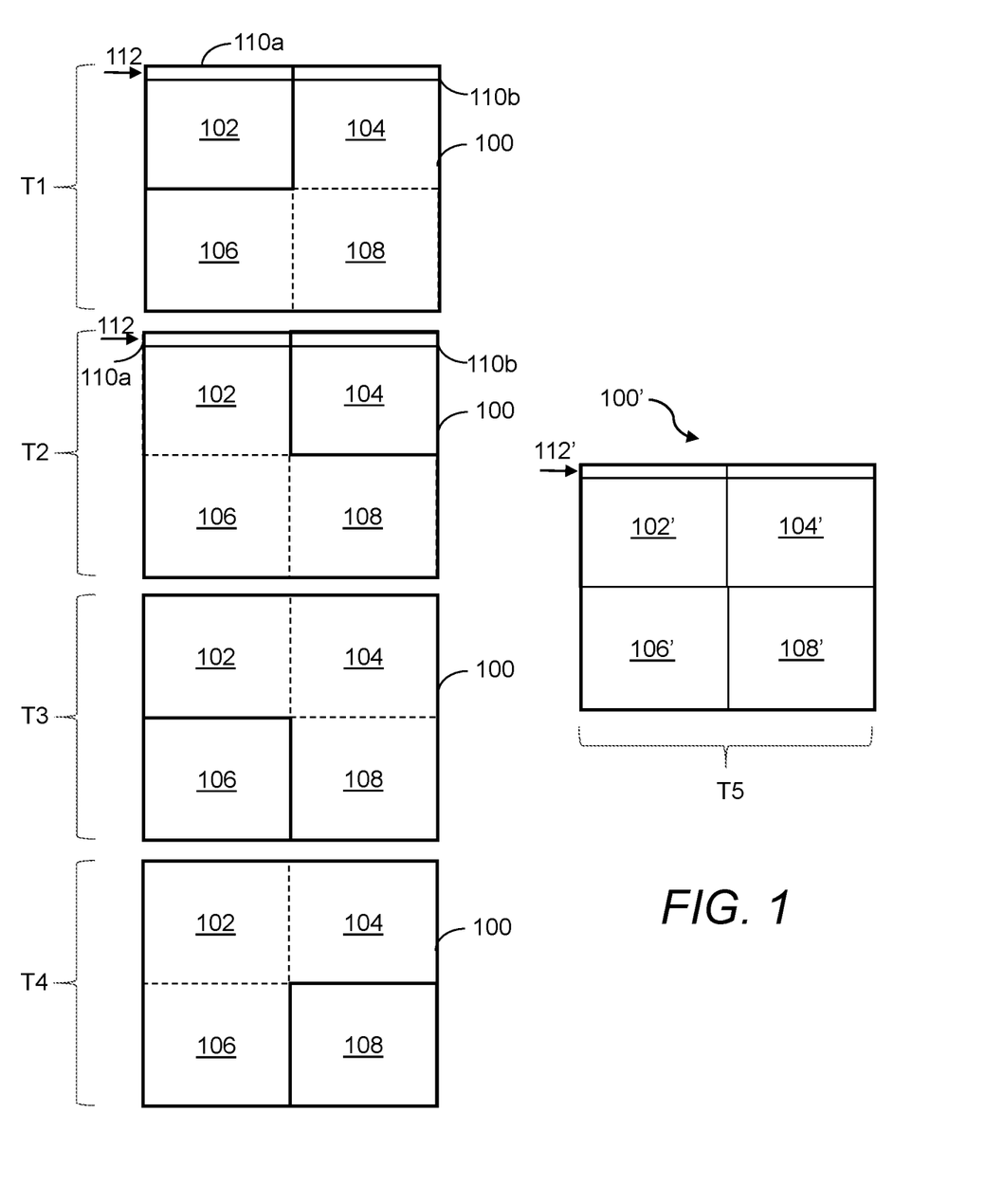
FIG. 1 is a schematic diagram illustrating generation of an output frame for display by a display device according to examples.

To put these examples into context, FIG. 1 will now be described. FIG. 1 is a schematic diagram illustrating an example of generation of an output frame for display by a display device. In FIG. 1, an input frame 100 is received, for display by a display device. The display device may be arranged to display a series of input frames sequentially as a video. In other cases, though, the input frame 100 may not form part of a video, but may instead represent a still image.

The input frame 100 is divided into portions. The input frame 100 may be divided into portions of predetermined shapes and/or sizes, for example to divide an input frame including a given number of pixels into a desired number of portions. In other cases, though, the input frame 100 may be divided into portions of varying shapes and/or sizes. For example, the shapes and/or sizes of respective portions that a plurality of input frames are divided into may change over time, e.g. depending on a content of each respective input frame.

In this example, the input frame 100 is divided into a first portion 102, a second portion 104, a third portion 106 and a fourth portion 108. This is merely an illustrative example, though. In other cases, an input frame may be divided into or otherwise include more or fewer portions than shown in FIG. 1. For example, the input frame may merely comprise the first and second portions 102, 104, without including the third and fourth portions 106, 108. In FIG. 1, each of the portions of the input frame 100 are the same size as each other, although this need not be the case in other examples. Similarly, while the portions of the input frame 100 correspond to blocks of pixels (which may be referred to as tiles), which are rectangular in shape, this is not intended to be limiting as an input frame may include portions of different shapes (such as irregular shapes or other regular shapes) and/or of different sizes. In FIG. 1, the portions of the input frame 100 do not overlap each other and therefore do not include any pixels in common. However, in other cases, at least some of the portions of an input frame may overlap each other. Overlapping portions of an input frame may each have at least one pixel which is present in each of the overlapping portions.

First data representative of the first portion 102 of the input frame 100 is processed using an image enhancement scheme, thereby generating first enhanced data. The first data is processed using the image enhancement scheme at a time T1 in the example of FIG. 1, which is indicated schematically in FIG. 1 by the bold outline of the first portion 102 of the input frame 100 at time T1. The first enhanced data is sent to a display interface for sending to a display device. In this example, other portions of the input frame 100 are not sent to the display device along with the first enhanced data at time T1, but are instead sent subsequently.

After sending the first enhanced data to the display device, further data is sent to the display interface for sending to the display device. The further data is associated with at least one further portion of the input frame 100, each of which is respectively different from the first portion 102 of the input frame 100. The at least one further portion of the input frame 100 in this example is different from corresponding portions of a previous frame (although this need not be the case in all examples). In some cases in which at least one portion of a given frame is the same as (or relatively similar to) a corresponding portion of a previous frame, processing of the at least one portion of the given frame (and sending of data representative of the at least one portion of the given frame to the display device) may be omitted, to reduce resource usage. In such cases, the corresponding portion of the previous frame may be used in place of the at least one portion of the given frame, during display of the given frame. In the example of FIG. 1, the further data includes portions associated, respectively, with the second portion 104, the third portion 106 and the fourth portion 108 of the input frame 100. Data representative of the at least one further portion of the input frame 100 may be processed to generate the further data, or the further data may represent the at least one further portion of the input frame 100 without additional processing. Further processing to generate the further data may include processing according to any suitable processing scheme, such as an image processing scheme for generating a portion of an output frame which is of a suitable visual quality for display. For example, such further processing may include processing of at least one further portion of the input frame using the image enhancement scheme or a different image enhancement scheme than the image enhancement scheme. It is to be appreciated that, where the input frame 100 includes a plurality of further portions, different ones of the plurality of further portions may be processed according to different respective processing schemes, such as different respective image enhancement schemes, (or may not undergo processing), or the same processing scheme may be applied to each of the further portions.

In the example of FIG. 1, second data representative of the second portion 104 of the input frame 100 is processed using the image enhancement scheme, thereby generating second enhanced data. The processing of the second portion 104 using the image enhancement scheme may be performed subsequently to the processing of the first portion 102 of the input frame 100 using the image enhancement scheme. This is the case in FIG. 1, in which the second portion 104 is processed using the image enhancement scheme at time T2, which is subsequent to time T1 at which the first portion 102 of the input frame 100 is processed using the image enhancement scheme. The second enhanced data is sent to the display interface subsequently to the first enhanced data in this case.

Third and fourth data representative of the third and fourth portions 106, 108 of the input frame 100 are processed using the image enhancement scheme, to generate third and fourth enhanced data, respectively, in the example of FIG. 1. In this case, the third portion 106 is processed subsequently to processing of the second portion 104, at time T3, and the fourth portion 108 is processed subsequently to processing of the third portion 106, at time T4. The third enhanced data is sent to the display interface subsequently to sending of the second enhanced data to the display interface, and the fourth enhanced data is sent to the display interface subsequently to sending of the third enhanced data to the display interface.

Instructions are sent to the display interface for sending to the display device to instruct the display device to display an output frame 100' comprising a first portion 102' represented by the first enhanced data and at least one further portion represented by the further data. In FIG. 1, the at least one further portion of the output frame 100' includes second 104', third 106' and fourth 108' portions represented by the second, third and fourth enhanced data, respectively. In this case, the further data therefore includes the second, third and fourth enhanced data.

The output frame 100' is formed of a plurality of portions, each of which were generated and/or sent to the display interface at different respective times. In other words, the output frame 100' may be considered to correspond to a mosaic of the plurality of portions. Respective portions of the output frame 100' may, in addition, be sent to the display device at different respective times, from the display interface. For example, the first enhanced data may be sent to the display device, via the display interface, after generation of the first enhanced data but before sending of further data (which may include second, third and fourth enhanced data) to the display device. This may be the case where the processing of the portions of the input frame 100 (which in FIG. 1 includes processing according to the image enhancement scheme) is performed by a display controller, which may be referred to as a display processor. For example, the display controller may be or include a display processor for processing the portions of the input frame 100 (and in some cases for performing additional processing). For example, the display controller may be configured to generate the first enhanced data and send the first enhanced data to the display interface without storing the first enhanced data in storage. In other words, the first enhanced data may be generated and transferred to the display interface (and, in some cases, to the display device) on-the-fly. In such cases, the processing of the first data representative of the first portion 102 of the input frame 100 to generate the first enhanced data, and the sending of the first enhanced data to the display interface may cease before data representative of at least one further portion of the input frame 100 is processed by the display controller. In such cases, the input frame 100 is processed in a portion-by-portion manner, which is less computationally intensive. Moreover, the number of memory accesses may be reduced by omitting storage of the first enhanced data in storage, which can reduce memory bandwidth. This is explained further with reference to FIG. 3, which illustrates schematically an example of such a display controller.

The display interface may send data to the display device as the data is received by the display interface. For example, where the display interface receives the first enhanced data before the further data, the display interface may send the first enhanced data to the display device without waiting to receive the further data. The display interface in such cases sends the further data to the display device subsequently to the first enhanced data. This may further reduce memory bandwidth as the first enhanced data and the further data may be sent to the display device without first storing the first enhanced data and the further data in storage. Hence, while in FIG. 1, the output frame 100' is displayed at time T5, which is after time T4, this need not be the case. For example, the display device may display the first portion of the output frame 100' represented by the first enhanced data before displaying at least one further portion of the output frame 100' (e.g. if a portion of the further data representing the at least one further portion of the output frame 100' has not been received by the display device at the time the first portion of the output frame 100' is displayed. This may be the case if the first portion represents a first plurality of rows of the output frame 100' and the at least one further portion of the output frame 100' represents further rows of the output frame 100', which are displayed subsequently to the first plurality of rows of the first portion, with the output frame 100' displayed in raster order by the display device). In other cases, in order to display the entire output frame 100', the first portion of the output frame 100' may be displayed using the first enhanced data and another portion of the output frame 100' (e.g. a remainder of the output frame 100') may be displayed using previously sent data representing a corresponding portion of a previous frame. The previously sent data may be enhanced data that has been processed according to the image enhancement scheme used to generate the first enhanced data. In further examples, the further data may not have undergone image enhancement. In such cases, the further data may be received by the display device in order to display the output frame 100' including the first portion of the output frame 100' and the at least one further portion of the output frame 100' (which in these cases have not been processed using the image enhancement scheme).

In the example of FIG. 1, the first portion 102 of the input frame 100 includes a first portion 110a of a row 112 of the input frame 100 (which in this case includes an array of pixels arranged in rows and columns). The first portion 102 in this case has a smaller width than a width of the input frame 100. In such cases, the at least one further portion of the input frame may include at least one further portion of the row of the input frame, such that the row of the input frame is formed by a combination of the first portion of the row and the at least one further portion of the row. This is the case in FIG. 1, in which the row 112 of the input frame 100 is formed by a combination of the first portion 110a of the row 112 and a second portion 110b of the row 112. The second portion 110b of the row 112 forms part of the second portion 104 of the input frame 110. In other cases, though, a row may include respective portions of more than two portions of an input frame.

In some cases, the display device is configured to display rows of the output frame 100' in raster order, i.e. one row of pixels at a time. In such cases, an output row 112' corresponding to the row 112 of the input frame may be displayed by the display device upon receipt of the first enhanced data and the second enhanced data but before receipt of the third and fourth enhanced data (which are not needed to display rows that are within solely the first and second portions 102', 104' of the output frame 100'). For example, the display device may begin to display, in raster order, rows of the output frame 100' that are in the first and second portions 102', 104' at around time T3, rather than waiting till a later time, T5, at which the entire input frame 100 has been processed and sent to the display device. This allows certain, potentially more important, portions of the output frame to be updated more rapidly than otherwise.

In other cases, though, the first portion 102 of the input frame 100 may include an entire row of the input frame 100. In such cases, the first enhanced data may be generated and sent to the display interface and to the display device (via the display interface) before generation and/or sending of the further data to the display interface and/or display device. In these cases, the first portion of the output frame represented by the first enhanced data may be displayed, e.g. in raster order, before the further data is sent to the display interface and/or display device. For example, where the first enhanced data is generated by a display controller, the display controller may be configured to send the first enhanced data and the further data to the display interface for sending of the first enhanced data to the display device before sending of the further data to the display device.

Figure 2:
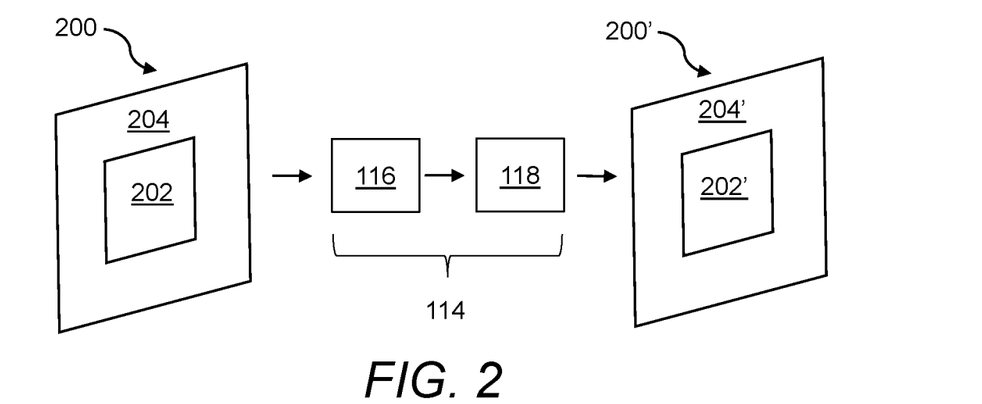
FIG. 2 is a schematic diagram illustrating processing of a first portion of an input frame with a convolutional neural network according to examples.

In some examples, the processing of the first portion of the input frame using the image enhancement scheme comprises processing the first portion of the input frame with a convolutional neural network (CNN) configured to receive an image portion of a given size as an input. In such cases, the first portion of the input frame may be the given size. FIG. 2 illustrates schematically such an example.

FIG. 2 shows a further example of a first portion 202 of an input frame 200 to be processed using an image enhancement scheme. In FIG. 2, the first portion 202 of the input frame 200 includes a more central portion of the input frame 200 than a second portion 204 of the input frame 200. The second portion 204 in this example surrounds the first portion 202. The first portion 202 may include a foreground of the input frame 200 and the second portion 204 may include a background of the input frame 200.

In FIG. 2, the first portion 202 of the input frame 200 is the same size as a given size of image portion a neural network, which in this example is a CNN 114, is configured to receive as an input. The given size may be the same as or larger than a receptive field of the neural network, which may be considered to be the region in input space (in this case, a portion of the input frame 200) that an output of the neural network is affected by. For example, the neural network may have a 41 pixel by 41 pixel receptive field, although this is merely an example. In such cases, the first portion 202 of the input frame 200 may similarly be 41 by 41 pixels in size.

The CNN 114 of FIG. 2 receives the first data representative of the first portion 202 of the input frame 200 as an input, and generates an output, which in this case is the first enhanced data representative of a first portion 202' of an output frame 200'. The CNN 114 of FIG. 2 includes at least one convolutional layer 116 and at least one deconvolutional layer 118 (which may be or include at least one fully-connected layer) between the input and output. However, this is merely an example and other CNNs may include more or fewer layers or layer(s) of different types. Furthermore, it is to be appreciated that the use of a CNN for the image enhancement scheme is merely an example. For example, other machine learning systems may be used to implement the image enhancement scheme in other examples.

The first data for example represents intensity values of respective pixels of the first portion 202 of the input frame 200. The first data may represent intensity values for each of at least one color channel (such as for each of a red, green and blue color channel). The intensity values for each color channel may be in the form of a two-dimensional (2D) matrix for the 2D array of pixels within the first portion 202.

In the example of FIG. 1, the CNN 114 has been trained to implement the image enhancement scheme, for example to increase a resolution, dynamic range and/or color range and/to perform tone mapping of a portion of an input frame input to the CNN 114 (in this case, the first portion 202). Training of the CNN 114 for example generates one or more kernels and/or biases associated with each of the convolutional layer(s) 116 and the deconvolutional layer(s) 118. A neural network (NN) typically includes a number of interconnected nodes, which may be referred to as artificial neurons, or neurons. The internal state of a neuron (sometimes referred to as the activation) typically depends on an input received by the neuron. The output of the neuron then depends on the input and the activation. A bias may be applied after a convolution of the kernel with an input or after the activation function is applied. The output of some neurons is connected to the input of other neurons, forming a directed, weighted graph in which edges (corresponding to neurons) or vertices (corresponding to connections) of the graph are associated with weights, respectively. The weights (which for example correspond with respective elements of kernels associated with layers of the NN) may be adjusted throughout training, altering the output of individual neurons and hence of the NN as a whole.

After the training phase, the CNN 114 (which may be referred to as a trained CNN 114) may be used to perform the task it has been trained to perform (in this case, image enhancement). This process may be referred to as inference. Inference in the example of FIG. 2 involves convolution of the kernels obtained during the training phase with respective intensity values of pixels of the first portion 202 of the input frame 200 to generate a series of feature maps using each of the convolutional layer(s) 116. The feature maps for example represent image features present in the first portion 202 of the input frame 200 such as corners or lines. The feature maps may then be deconvolved using the deconvolutional layer(s) 118 to generate the first enhanced data. It is to be appreciated that, in some cases, the CNN 114 may include additional processing not shown in FIG. 2, such as the processing of a feature map generated by a convolutional layer 116 with a suitable activation feature (sometimes referred to as a rectifier), which is a non-linear function used to map an input to a predefined output, such as a value which is 0 or greater, e.g. the rectified linear unit (ReLU) function.

Processing the first data representative of the first portion 202 of the input frame 200 using the CNN 114 generates first enhanced data, which in this example is representative of the first portion 202' of the output frame 200'. The first enhanced data may represent intensity values for respective pixels of the first portion 202' of the output frame 200', for each of at least one color channel, after the image enhancement has been performed.

Second data representative of the second portion 204 of the input frame 200 may similarly be processed using the CNN 114 to generate second enhanced data representative of a second portion 204' of the output frame 200' after the image enhancement has been performed. The second data may be processed subsequently to the first data, for example after the first enhanced data has been sent to a display interface for sending to a display device for display.

Figure 3:
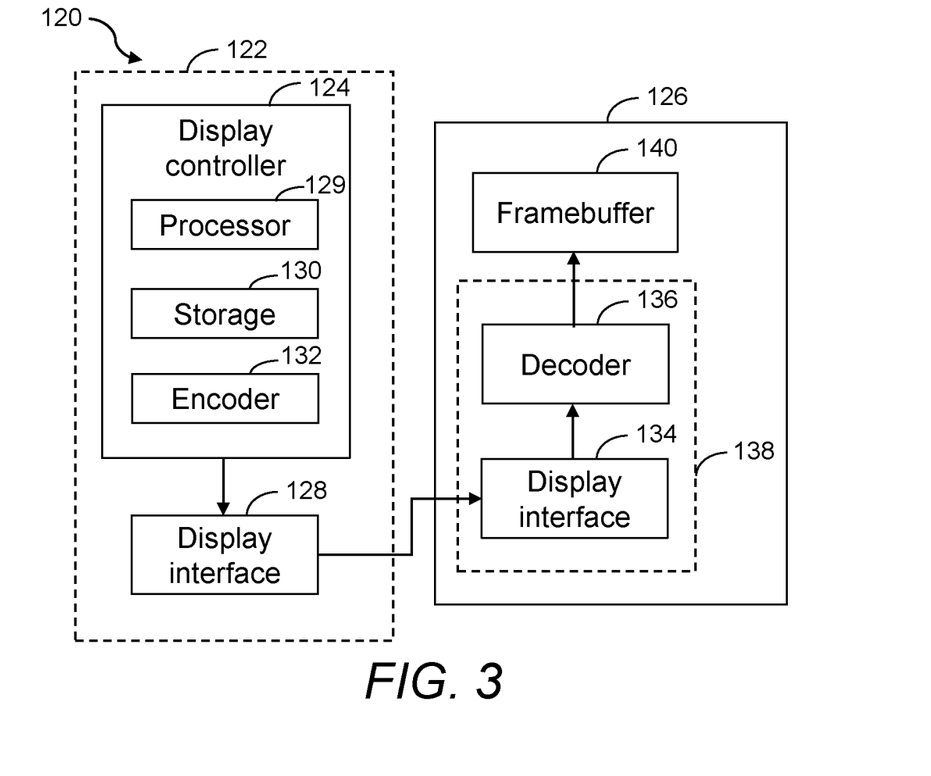
FIG. 3 is a schematic diagram illustrating a system for performing methods according to examples herein.

FIG. 3 is a schematic diagram illustrating a system 120 for performing methods according to examples herein, such as the methods described with reference to FIGS. 1 and 2. The system 120 includes a processor system 122 including a display controller 124. The display controller 124 may be or include a display processing unit (DPU). The processor system 122 is arranged to implement various processing methods in order to generate or otherwise obtain an input frame for display by a display device 126. The processor system 122 may be or include a main processor of a computing device (sometimes referred to as a central processing unit (CPU)), at least one graphics processing unit (GPU), at least one video processing unit (VPU), as described further with reference to FIG. 4.

The display controller 124 of FIG. 3 is arranged to control the transfer of data, via a display interface 128, to the display device 126 for display. The display interface 128 is for example a Mobile Industry Processor Interface (MIPI) Display Serial Interface (DSI). Data transferred via the display interface 128 may be compressed, for example with Display Stream Compression (DSC). A display controller such as the display controller 124 of FIG. 3 may perform some processing of input data, such as an input frame, before transfer of the data to the display interface 128. However, the processed data may be sent to the display interface 128 by the display controller without storage of the processed data in storage. In some cases, the display controller 124 may be referred to as a display processor, due to the ability of the display controller 124 to perform at least some processing of input data. For example, a display controller may perform color space conversion to convert image data from an input color space such as the YUV color space to an output color space such as the RGB (red, green, blue) color space. As the skilled person will appreciate, in the YUV color space, Y represents the luma of a color, U represents the difference between the blue component of the color and the luma and V represents the difference between the red component of the color and the luma). The display controller may also or instead perform image processing, such as image scaling, image rotation, image sharpening and/or image contrast adjustment. In some cases, a display controller may composite multiple images (e.g. corresponding to different image windows or image layers) to generate a frame for display. For example, images corresponding to different windows or layers may be stored in different respective framebuffers (or other storage). These images may be retrieved from the framebuffers and composited using the display controller to generate a single frame for display by the display device 128.

In the example of FIG. 3, the display controller 124 is configured to process first data representative of a first portion of an input frame using an image enhancement scheme, thereby generating first enhanced data. By processing the first portion of the input frame using the image enhancement scheme, using the display controller 124, the number of memory accesses may be reduced compared to implementing the image enhancement scheme elsewhere in a computing system. For example, implementing the image enhancement scheme using a GPU may involve fetching a low-resolution frame from a low-resolution framebuffer, processing of the low-resolution frame using the GPU to generate a high-resolution frame, and subsequent storage of the high-resolution frame in a high-resolution framebuffer. The high-resolution frame may then be fetched from the high-resolution framebuffer by a display controller for display. However, this involves more memory accesses than implementing the image enhancement scheme using the display controller, as in examples herein. Examples herein are therefore more efficient than otherwise.

Furthermore, the image enhancement scheme typically has significant processing and memory requirements for input and output data, various feature maps, kernel weights and/or biases. However, by processing the first data, which represents less than all of the input frame, local buffer requirements are reduced.

The display controller 124 of FIG. 3 includes storage 130 for storing the first data before the image enhancement scheme is performed. The storage 130 is for example local storage (which may be referred to as "on-chip" storage where the display controller 124 is implemented in hardware). This allows the first data to be obtained more rapidly by the display controller 124 than if the first data were stored in storage external to the display controller 124. The first data may be obtained from storage external to the display controller 124 as described further with reference to FIG. 4, and stored in the storage 130 temporarily. In these cases, the storage 130 acts as a buffer for temporary storage of data to be processed by the display processor 124 or to be used in processing performed by the display processor 124. For example, other data, such as weight data representative of kernel weights for kernels of a CNN for implementing the image enhancement scheme or metadata for other image enhancement schemes that do not include the use of a CNN, may be stored in the storage 130 of the display controller 124. Moreover, where the image enhancement scheme is implemented using a CNN, the storage 130 typically also stores intermediate output feature maps generated by a layer of the CNN, and which are used as input feature maps for a subsequent layer of the CNN. If these output feature maps are stored in on-chip storage 130, the amount of external memory bandwidth is significantly reduced. Throughput is also increased, as it is faster to access on-chip memory than external memory, and power consumption is reduced.

In some cases, the display controller 124 may store the first data in the storage 130 without storing data representative of other portions of an input frame at that time. In this way, the storage requirements may be reduced compared to storing the entire input frame. For example, where the first data represents a first portion (of 41 by 41 pixels) of an input frame (which is e.g. 3840 by 2160 pixels in size), the storage requirements for storing the first data may be 41×41×30, i.e. ~6.5 KB (kilobytes), where each pixel is up to 30 bits in bit depth in this example. In some instances, though, the storage 130 may have larger capacity than a minimum capacity for storage of portions of an input frame of a given size to be processed using the image enhancement scheme. This may improve the efficiency of processing. For example, if there are a plurality of portions of an input frame that are partially overlapping, the storage 130 may store data representative of the plurality of portions to reduce the number of times data is read into the storage 130. For example, the storage 130 may be arranged to store a 41×60 portion of an input frame, despite this being larger than the receptive field of a CNN for implementing the image enhancement scheme (which in this example is 41×41 pixels). In some cases, external memory accesses preferably involve fetching data in bursts of a predetermined size, such as 64 bytes or larger to maximise memory access efficiency and reduce power consumption. In these cases, the storage 130 may be arranged to store a portion of an input frame with the predetermined size, to reduce the number of external memory accesses.

In some examples, the storage 130 may be arranged to store at least a portion of a given layer of an input frame, for example corresponding to a given window of the input frame or corresponding to image data received from a different respective origin. For example, one layer may correspond to image data representing a video and another layer may correspond to image data representing a game. In multi-layer examples such as this, the layers may be composited, e.g. by the display controller 124, to generate a frame for display. Typically the layers are composited to generate the input frame before the input frame is processed using the image enhancement scheme. Most layers will be opaque, however some layers may be at least partially transparent. For example, alpha blending may be used to combine layers to create the appearance or partial or full transparency. Some or all of the layers may be of different quality levels and may have a different respective resolution, color space, color depth and/or other image characteristic. Due to this, different processing techniques may be applied to at least one of the layers, such as different scaling, rotation and/or color conversion techniques. The layers may be obtained from different respective framebuffers, which are for example coupled to or otherwise accessible to the processing system 120. In examples such as this, the first portion of the input frame (which is processed using the image enhancement scheme) may be a portion of a given layer. A first portion of at least one further layer may not be processed using the image enhancement scheme or may be processed according to a different processing scheme than the image enhancement scheme. For example, where a low resolution video and a high resolution graphical user interface (GUI) occupy the same region of a frame, the image enhancement scheme may be enabled for only the part of the region occupied by the GUI. An indication of the different portions of a given region may be stored, e.g. in the form of a per-pixel bit map, to indicate which portions should be processed according to the image enhancement scheme and which other portions should not undergo further processing or should be processing using a different image processing scheme.

In the example of FIG. 3, the display controller 124 includes at least one processor 129 for implementing the image enhancement scheme. The at least one processor 129 may be or include any suitable processor such as at least one CPU or GPU. Due to the inclusion of the at least one processor 129 in the display controller 124, the display controller 124 itself may be referred to as a display processor or display processing unit (DPU). In some cases, the image enhancement scheme implemented by the display controller 124 may be performed by a neural network accelerator (NNA) of the display controller 124. For example, the at least one processor 129 may comprise an NNA. An NNA is a processor dedicated to implementing the inference phase of a neural network, and may be referred to as a neural processing unit (NPU). In such cases, the NNA is configured to implement a neural network which is trained to implement the image enhancement scheme, such as those described herein. In other examples, though, a neural network may be implemented using a more general processor, such as a CPU or GPU of the display controller 124. The display controller 124 may be implemented using machine readable instructions and suitably programmed or configured hardware, such as circuitry. For example, the display controller 124 may be or comprise an integrated circuit (IC), such as a system on a chip (SoC). In other cases, the display controller 124 may be implemented in software or in a combination of hardware and software.

The display controller 124 in the example of FIG. 3 is further configured to send the first enhanced data to the display interface 128 for sending to the display device 126 for display. In some cases, the display controller 124 sends the first enhanced data to the display interface 128 without storage of the first enhanced data. For example, the first enhanced data may be sent to the display interface 128 by the display controller 124 without storing the first enhanced data in storage external to the display controller 124 (and subsequent retrieval of the first enhanced data from the external storage). This reduces memory bandwidth, power consumption, and size requirements compared to examples in which the first enhanced data is written into storage and subsequently read from storage.

In examples such as FIG. 3, the display controller 124 is configured to compress the first enhanced data before sending the first enhanced data to the display interface 128. This may be referred to as display interface compression, as it relates to compression of data for transfer by the display interface 128. In examples such as FIG. 3, the display interface 128 supports compression, which reduces power consumption, and bandwidth required, to send data from the display controller 124 to the display device 126. In such cases, other data transferred from the display controller 124 to the display device 126, via the display interface 128, may be compressed, e.g. including data representing a frame that has not undergone image enhancement scheme or that has been processed using a processing scheme different from image enhancement scheme. In FIG. 3, the display controller 124 includes an encoder 132 configured to perform the compression. By compressing the first enhanced data, the size of the first enhanced data may be reduced. This reduces the bandwidth associated with sending of the first enhanced data to the display device 126, via the display interface 128. Any suitable compression algorithm may be used, which may be lossy or lossless. For example, Display Stream Compression (DSC), which is a lossy compression algorithm, may be used to compress the first enhanced data. In such cases, the display interface 128 may be considered to support DSC. DSC allows 1 dimensional or 2 dimensional blocks of pixels to be compressed. This means that the first enhanced data can be compressed using DSC in cases where the first enhanced data represents a single row of pixels. Furthermore, the first enhanced data can be compressed using DSC and sent to the display interface 128 in raster order. The display interface 128 can, in turn, send the first enhanced data to the display device 126 in raster order. This allows existing display interface and display device components to be used, which are configured to send and/or receive data in raster order. For example, where a width of the first portion of the input frame is less than a width of the entire input frame, this may involve sending part of at least one row (the part of the at least one row within the first portion) to the display interface 128 and/or display device 126 in raster order. Subsequent part(s) of the at least one row may be sent subsequently to the display interface 128 and/or display device 126, with each part also being sent in raster order. It is to be appreciated that the use of DSC compression is merely an example, though, and other examples may involve the use of other compression algorithms, including other algorithms that can be used to compress data on a row-by-row basis or data representing tiles of varying sizes. Furthermore, in other examples, the first enhanced data (and other data sent from the display controller 124 to the display interface 128 and/or display device 126) need not be sent in raster order.

In some cases, the display controller 124 is configured to determine a compression ratio for the first enhanced data based on a visual characteristic of the first portion of the input frame, and to compress the first enhanced data with the compression ratio. A visual characteristic for example refers to any visual information represented by a given portion of the input frame, and may for example correspond to an image feature such as a corner, line, or particular object or more generally to a content of the given portion of the input frame. The visual characteristic may be or include color information, such as a color depth or color range present in the given portion of the input frame. The visual characteristic may represent a type of content of a given portion of the input frame. For example, the visual characteristic for one portion of the input frame may indicate that that portion represents a graphical user interface (GUI). The visual characteristic for a different portion of the input frame may, however, indicate that that portion represents a video. While the visual characteristic indicates visual information, such visual information need not be perceptible to a viewer, but may nevertheless be discernible by computer processing of the given portion of the input frame.

The visual characteristic may additionally or alternative include a compression characteristic, indicative of an amount of compression previously applied to the first portion of the input frame to obtain the first data. In such cases, the visual characteristic may be obtained from compression metadata associated with the first data, which may indicate the amount of compression applied previously. For example, the first data may have previously been compressed using the Arm® Framebuffer Compression (AFBC) protocol, which may be used to losslessly compress data for transfer between different components of a system on a chip (SoC). In such cases, metadata associated with the first data, generated during the AFBC process, may indicate the color range of the first data. The smaller the color range, typically the smaller the amount of detail in the first portion of the input frame. In some cases, the size of the first data may be indicative of the visual characteristic of the first portion of the input frame. The smaller the size of the first data, typically the smaller the amount of detail in the first portion of the input frame. The smaller the amount of detail in the first portion of the input frame, the greater the compression ratio in some cases. In this way, more detailed portions of the input frame may undergo less compression than less detailed portions of the input frame. This may improve the quality of the output frame. For example, by subjecting the more detailed portions of the input frame to a lower amount of compression, compression artefacts in these portions of the input frame may be reduced compared to other portions of the input frame. This may improve the perceived display quality as observed by a user compared to applying the same amount of compression to all portions of the input frame. For example, where the input frame comprises the first portion and a second portion, different from the first portion, the display controller 124 may be configured to compress the first enhanced data with a first compression ratio and compress the second data with a second compression ratio different from the first compression ratio. The display controller 124 may instead or additionally be configured to send the first enhanced data to the display interface with a first bit depth and send the second data to the display interface with a second bit depth, different from the first bit depth. For example, with reference to the example in which one portion of the input frame forms part of a GUI and a different portion forms part of a video, the portion of the input frame forming part of the GUI may be compressed to a greater extent (e.g. with a higher compression ratio and/or low bit depth) than the different portion. In such cases, the second data forms part of the further data, which is sent to the display interface for display by the display device.

In addition to or instead of determining a compression ratio for the first enhanced data based on a visual characteristic of the first portion of the input frame, the display controller may determine a compression ratio for the first enhanced data based on a bandwidth associated with transfer of data by the display interface 128 to the display device 126. The bandwidth associated with this transfer of data is for example the maximum rate of data transfer by the display interface 128 to the display device 126 or the achieved throughput of data transfer by the display interface 128 to the display device 126 (e.g. the average rate of successful data transfer). For example, the compression ratio of the first enhanced data may be determined using a rate control mechanism, where the compression ratio is balanced against the available bandwidth. In this way, the quality of the output frame may be increased for a given bandwidth, e.g. by reducing the compression ratio if the bandwidth increases. In other words, the compression ratio of enhanced data generated by the display controller and compressed by the encoder 132 may vary dynamically, to improve usage of the available bandwidth for transferring data from the display interface 128 to the display device 126.

In FIG. 3, after undergoing compression, the first enhanced data is sent to the display interface 128 for sending to the display device 126. In examples such as FIG. 3, only the portion of the input frame (the first portion in this case) is sent from the display controller 124 to the display device 126 at a given time. In other words, the first enhanced data is sent to the display interface 128 for sending to the display device 126 without sending the further data to the display interface 128 at that time. Similarly, the first enhanced data may be sent to the display device 126 at a given time without sending the further data to the display interface 128 at that time. However, after subsequently receiving the further data (representing at least one further portion of the input frame), the output frame can be formed as a combination of a first portion represented by the first enhanced data and at least one further portion represented by the further data. The first enhanced data may be transferred between the display controller 124 and the display interface 128 using any suitable bus.

The display interface 128 may be any suitable interface, which may an internal interface (which is internal to a computing device including the display controller 124 and the display device 126) or an external interface, to connect the display controller 124 to an external display device. In an example, the display interface 128 is a Mobile Industry Processor Interface (MIPI) Display Serial Interface (DSI), which provides a high speed serial interface between a host processor (such as the processing system 122 comprising the display controller 124) and a display (such as the display device 126). The MIPI DSI may be used to send one dimensional and two dimensional pixel blocks (which may be less than a row width and/or column height) to the display device 126.

After receiving the first enhanced data, the display interface 128 sends the first enhanced data to the display device 126. The first enhanced data sent by the display interface 128 of the processing system 122 is received by a display interface 134 of the display device 126. The display interface 134 of the display device 126 is typically the same as the display interface 128 of the processing system 122, and may therefore also be a MIPI DSI.

In this case, the first enhanced data has undergone compression prior to transfer of the first enhanced data to the display device 126. To decompress the first enhanced data, decompression is performed by a decoder 136 of the display device 126. The decompression performed by the decoder 136 substantially reverses the compression performed by the encoder 132, to obtain decompressed first enhanced data which is substantially the same as the first enhanced data prior to compression. The first enhanced data and the decompressed first enhanced data are the same where the encoder 132 and decoder 136 perform lossless compression and decompression. However, where the compression and decompression are lossy, the decompressed first enhanced data may differ from the first enhanced data due to the lossy compression and decompression. For example, the decompressed first enhanced data may include compression artefacts. Nevertheless, despite such compression artefacts, in examples the decompressed first enhanced data represents the first portion of the input frame after being processed using the image enhancement scheme with a sufficiently high accuracy. In this case, as the first enhanced data is compressed according to the DSC protocol, the first SR may similarly be decompressed according to the DSC protocol.

The display interface 134 and the decoder 136 are implemented by a display driver IC 138 of the display device 126 in the example of FIG. 3. However, this is merely an example, and in other cases, the display interface 134 and/or the decoder 136 may be implemented by a different component than the display driver IC 138, which may be a hardware or software component or include a combination of hardware and software.

The first enhanced data after decompression in the example of FIG. 3 is stored in storage of the display device 126, which in this case is a framebuffer 140. For example, the first enhanced data may be stored until sufficient data has been sent to the display device 126 for the display device 126 to display an entire row of an output frame. At that point, the data representing the row of the output frame is read from the framebuffer 140 and displayed using the display device 126.

In the example of FIG. 3, the further data is subsequently sent to the display interface 128 for sending to the display device 126. In other words, the further data is sent to the display interface 128 after the first enhanced data is sent to the display interface 128. In some cases, the further data is also sent from the display interface 128 to the display device 126 after the first enhanced data is sent from the display interface 128 to the display device 126. As discussed with reference to FIGS. 1 and 2, the further data (or a portion thereof) may be processed using the image enhancement scheme or be processed according to a different image processing scheme than the image enhancement scheme, before being sent to the display interface 128. Like the first enhanced data, the further data may undergo compression by the encoder 132. An amount of compression applied by the encoder 132 to the further data (or a portion thereof) may differ from that applied to the first enhanced data. Upon receipt of the further data at the display device 126, and decompression of the further data (if needed), the further data (or at least part of the further data) may be stored in the framebuffer 140 the first enhanced data is or was stored in. In other examples, though, at least part of the further data may be stored in at least one further framebuffer or other storage of the display device 126 different from the framebuffer 140.

In this way, the data corresponding to the output frame for display by the display device 126 is sent to the display device 126 by the display controller 124 as a series of portions, sequentially, rather than in a single pass. This allows the data to be generated sequentially by the display controller 124, which is more computationally efficient than generating the entire output frame in one go. Furthermore, the data can be transferred in smaller chunks, which reduces memory bandwidth.

In order to inform the display device 126 of the portion of the output frame represented by a given portion of data, the display controller 124 also sends instructions to the display interface 128 for sending to the display device 126 to instruct the display device 126 to display the output frame comprising the respective portions. For example, where the display device 126 is to display the output frame 100' of FIG. 1, the display controller 124 may send instructions to the display device 126 to instruct the display device 126 to display the first portion 102' in the upper left portion of the display device 126, the second portion 104' in the upper right portion of the display device 126, the third portion 106' in the lower left portion of the display device 126 and the fourth portion 108' in the lower right portion of the display device 126. Typically, the instructions include a command to instruct the display device 126 to display the output frame comprising the respective portions in addition to data indicating the (x, y) coordinates of the first portion 102' in the output frame, although instructions of other formats are possible. In examples, the instructions are sent to the display interface 128 (and in some cases to the display device 126) prior to sending the first enhanced data, e.g. prior to sending any data representative of a given frame for display by the display device 126. These instructions may be sent on a frame-by-frame basis, to improve flexibility, e.g. if different input frames are divided differently into portions for processing. In other cases, though, these instructions may be sent less frequently.

Processing an input frame on a portion-by-portion basis facilitates flexible processing of the input frame, for example with different processing applied to different respective portions of a given input frame. For example, the display controller 124 may be configured to process second data representative of a second portion of the input frame using an image enhancement scheme different from the image enhancement scheme that is applied to the first portion of the input frame, thereby generating processed second data. In such cases, the image enhancement scheme used to process the first portion of the input frame may be referred to as a first image enhancement scheme and the image enhancement scheme used to process the second portion of the input frame may be referred to as a second image enhancement scheme. In such cases, the second portion of the input frame is different from the first portion of the input frame and the further data comprises the processed data. With this approach, appropriate processing may be applied to different respective portions of an input frame, to increase the image quality or, alternatively, to reduce processing requirements, memory bandwidth and/or power consumption.

As an example, an execution time for the second image enhancement scheme may be less than an execution time for the first image enhancement scheme. An execution time is for example the amount of time spent by the display controller 124 on performing a given task. In such cases, the second image enhancement scheme is less computationally intensive than the first image enhancement scheme. Hence, processing the second portion of the input frame with the second image enhancement scheme instead of the first image enhancement scheme is more efficient. The second image enhancement scheme may, however, produce a lower quality than the first image enhancement scheme. However, if the second portion of the output frame is in a less important or less visible region than the first portion of the output frame, a reduction in quality of the second portion of the output frame may not be noticeable to a viewer of the output frame. Hence, processing requirements may be reduced without unduly affecting the display quality. In some examples, the first image enhancement scheme is based on machine learning, and includes processing of the first data using a neural network, whereas the second image enhancement scheme does not involve machine learning. Instead, the second image enhancement scheme may involve upscaling the second portion of the input frame by replicating, averaging or interpolating existing pixel values.

In examples such as this, the display controller 124 may be configured to process the second data using the second image enhancement scheme in response to determining that an estimated resource consumption for processing the second portion of the input frame using the first image enhancement scheme meets or exceeds a threshold resource consumption. Resource consumption in this context refers to use of any computing resource of the computing device 142 and may refer to an execution time, power consumption, memory bandwidth (for accessing external and/or internal memory), and/or display interface bandwidth used during the performance of a given processing task (in this case, processing of a given portion of the input frame using the first image enhancement scheme). For example, the display controller 24 may be configured to process the second data using the second image enhancement scheme in response to determining that an estimated execution time for processing the second portion of the input frame using the first image enhancement scheme meets or exceeds a threshold execution time. For example, it may be identified that processing of the second portion of the input frame using the first image enhancement scheme is likely to cause an underrun. An underrun in this context for example refers to a display controller being unable to process and transfer data to the display device sufficiently quickly for display. An underrun can lead to image corruption or may lead to a given region of the display device not being updated for a given frame. In such cases, the previous frame may be displayed in the given region of the display device instead, which can reduce the display quality, e.g. if there has been a significant change between the previous frame and the frame which is to be displayed. For example, underrun may occur where the first image enhancement scheme is so time consuming that performing the image enhancement scheme of the second data would not be complete by the time the processed second data is to be transferred to the display device for display. Where the first image enhancement scheme involves machine learning techniques, such as a neural network, this involves deterministic processing and memory accesses. The deterministic nature of such an image enhancement scheme means that the time a particular portion of the processing implemented using the image enhancement scheme will take is already known, allowing a potential underrun to be identified. Where a potential underrun is identified, the second portion of the input frame may be processed using a less computationally intensive image enhancement scheme (which typically does not involve machine learning). In this way, an actual underrun may be avoided. The second image enhancement scheme used to process the second data in such cases may be used to upscale the second portion of the input frame without using a first image enhancement scheme comprising deep learning (DL) super-resolution (SR) image processing. For example, a less complex upscaling process may be used than DL SR image processing, such as an upscaling process based on replication or averaging of existing pixel values.

In other cases, the display controller 124 may be configured to determine that the first image enhancement scheme is to be applied to the first portion of the input frame and that the second image enhancement scheme is to be applied to the second portion of the input frame based on at least one of a first visual characteristic of the first portion of the input frame or a second visual characteristic of the second portion of the input frame. For example, as the second image enhancement scheme typically produces a lower quality output than the first image enhancement scheme, the first image enhancement scheme may be applied to portions of an input frame with more interesting or important content (such as a foreground or central portion of the input frame) with the second image enhancement scheme applied to other portions of the input frame (such as a background or peripheral region of the input frame). This may reduce processing requirements without unduly affecting the quality of the output frame. For example, different processing may be applied to different portions of the input frame depending on a desired resolution for a given portion and/or a color depth for the given portion. In some cases, the content of a given portion of the input frame may be representative of compression artefacts present in the given portion. By analyzing the content of the given portion, such as at least one visual characteristic of the given portion, such compression artefacts may be identified and appropriate processing may be selected for the given portion (such as the first image enhancement scheme, the second image enhancement scheme, a yet further image enhancement scheme or no processing). For example, it may not be desirable to apply the first image enhancement scheme to portions of an input frame that suffer from extensive compression artefacts, as this may make the compression artefacts more visible in the output frame. Conversely, higher quality portions of the input frame (with lower compression artefacts) may be enhanced using the first image enhancement scheme without unduly affecting the quality of the output frame. Furthermore, in some cases, an image enhancement scheme may be omitted entirely, e.g. if a particular frame is of a sufficiently high quality.

In examples, more important regions of the input frame are processed first, i.e. before less important regions of the input frame, using the first image enhancement scheme. The enhanced data generated is compressed at an appropriate level for transfer by the display interface 128, and is transferred serially to the display device 126, via the display interface 128. In such cases, the first portion of the input frame may be considered to be a more important region of the input frame, such as a central region or a foreground of the input frame. It may be determined in these examples that a time, or bandwidth used, for sending the enhanced data to the display device 126 is longer than expected. In order to meet a predetermined time constraint in such cases, e.g. such that the entirety of the output frame has been transferred to the display device 126 in time for the display device 126 to display the output frame according to a predetermined frame rate associated with the display device 126, subsequently generated enhanced data, such as that associated with the second portion of the input frame, may be compressed to a greater extent than the first enhanced data. This reduces the bit size of this subsequent enhanced data, allowing it to be transferred more rapidly than the previous, less compressed, data. In this way, an underrun may be avoided. As this subsequent enhanced data will be more highly compressed, it may be a less effective use of resources to apply a high quality image enhancement scheme to this data, as the increased compression typically increases compression artefacts and reduces the quality of the portion(s) of the image represented by the subsequent enhanced data. Instead, power and processing resources may be saved be omitting such processing, e.g. by processing this data using a lower quality image enhancement scheme. For example, in such cases, the display controller 124 may be configured to process the second data using the second image enhancement scheme in response to determining that an average rate for sending enhanced data associated with a plurality of portions of the input frame to the display device, via the display interface, prior to processing the second data is less than a threshold rate. In such cases, the data associated with the input frame comprises the first enhanced data, which is generated by processing the first data representative of the first portion of the input frame using the first image enhancement scheme, which in this case is more computationally complex than the second image enhancement scheme.

In some cases, processing requirements may be reduced by omitting use of an image enhancement scheme for certain portions of an input frame, such as those for which there are large changes between consecutive frames. For example, the display controller 124 may be configured to identify a first portion of a subsequent input frame that corresponds to the first portion of the input frame and process the first data and subsequent first data representative of the first portion of a subsequent input frame to determine a difference between the first portion of the input frame and the first portion of the subsequent input frame. Such a difference may indicate that the input frame forms part of a video including relatively rapid motion or change. Detail may be less visible in such a video than in a video including a less rapidly moving or less rapidly changing scene. On this basis, processing may be reduced by omitting processing of the first portion of the subsequent input frame using the image enhancement scheme without noticeably affecting the display quality as perceived by a viewer. In such cases, the display controller 124 may be configured to determine whether to use the image enhancement scheme for the first portion of the subsequent input frame based on the difference. For example, the display controller 124 may be configured to determine that the difference meets or exceeds a threshold difference and process the subsequent first data to perform upscaling of the first portion of the subsequent input frame without using the image enhancement scheme. Conversely, if the difference is less than the threshold difference, the display controller 124 may process the subsequent first data to process the first portion of the subsequent input frame using the image enhancement scheme.

The difference between the first portion of the input frame and the first portion of the subsequent input frame may be determined based on a first signature representative of the first portion of the input frame and a subsequent first signature representative of the first portion of the subsequent input frame. A signature of a given portion of an input frame for example corresponds to a lower dimensional representation of the given portion, which may be processed and/or stored more efficiently than the given portion itself. For example, a signature may be obtained by processing data representative of the given portion (such as the first data representative of the first portion of the input frame) using a hash function. If two signatures are the same, this indicates that the two frame portions represented by the signatures are likely to be similar. Conversely, if the signatures are different, this indicates that the two frame portions are likely to be different from each other. The difference between the first portion of the input frame and the first portion of the subsequent input frame may be determined using a single signature to represent each of these first portions. By comparing the signatures for each of these first portions, it can be determined whether the first portions are likely to be the same as or different from each other.

In some cases, a plurality of signatures may be generated for a given portion of a frame, e.g. for a 16 by 16 tile of a frame. For example, a first signature may be based on the lower portion color bits of the data representative of the given portion of the frame, such as the 4 least significant bits of each of a plurality of color channels (e.g. red, green blue). The first signature may therefore represent the least significant bits of the data. A second signature may be based on the upper portion color bits of the data representative of the given portion of the frame, such as the 4 most significant bits of each of the plurality of color channels. The second signature may therefore represent the most significant bits of the data. If the first and second signatures are the same for two different frame portions (e.g. the first portions of the input frame and the subsequent input frame), it is likely that the two frame portions are the same as each other. If the second signature is the same but the first signature is different, then it is likely that the difference between the two frame portions is fairly small. If, however, the second signatures are different from each other or both the first and second signatures are different from each other, then it is likely that the two frame portions are different from each other. In such cases, the image enhancement scheme may be omitted, as it may be determined that the subsequent input frame has changed significantly. For example, this may indicate that the input frame and the subsequent input frame are displaying a rapidly moving or rapidly changing scene, such as running water. In these cases, the display quality of respective portions of an output frame displayed to a viewer may be less noticeable to the viewer, as the viewer's attention may be focused on the movement or changes in the scene displayed. Hence, to reduce resource usage, use of the image enhancement scheme to enhance the subsequent output frame may be omitted (or a less computationally intensive image enhancement scheme may be applied than the image enhancement scheme) without noticeably decreasing the quality of the subsequent output frame as perceived by a viewer. If it is determined that the first portions of the input frame and the subsequent input frame are similar to each other, the subsequent input frame may be processed using the image enhancement scheme. If, however, it is determined that the first portions of the input frame and the subsequent input frame are the same, the first portion of the subsequent input frame may not be processed using the image enhancement scheme. Instead, the first enhanced data may be used to represent the first portion of the subsequent input frame, to avoid duplicating the processing associated with the image enhancement scheme. In such cases, the subsequent first data may not be sent to the display device for display. Instead, the first portion of the input frame (represented by the first enhanced data) is displayed as part of the subsequent output frame.

In some cases, the display controller is configured to control the order in which image enhancement is applied to a series of frames. For example, image enhancement may be applied to more important regions (such as a central region or a foreground region) than to less important regions (such as a peripheral region or a background region) of an input frame. In one example, the first portion of the input frame corresponds to a central or foreground region of the input frame. First data representing the first portion of the input frame is processed using the image enhancement scheme. However, second data representing a second portion of the input frame that represents a less important region (such as a peripheral or background region of the input frame) is not processed using the image enhancement scheme. For example, the first data may be processed using a first image enhancement scheme and the second data may be processed using a second image enhancement scheme, which is e.g. less computationally intensive than the first image enhancement scheme. When a subsequent input frame is received, the subsequent input frame and the input frame may be compared to each other to identify if respective portions of the subsequent input frame and the input frame are similar to or different from each other. In one example, the difference between the first portions of the input frame and the subsequent input frame is determined and it is identified that the first portions of the input frame and the subsequent input frame are the same as each other. To reduce unnecessary processing, further processing of the first portion of the subsequent input frame is omitted in this case, and the first enhanced data is used for displaying the first portion of a subsequent output frame based on the subsequent input frame. In this case, the first enhanced data was sent to the display device for the input frame, so sending of further data to the display device for displaying the first portion of the subsequent output frame is not necessary. In this example, the display controller is further configured to identify a second portion of a subsequent input frame that corresponds to the second portion of the input frame and determine that a difference between the second portion of the input frame and a second portion of the subsequent input frame is less than a threshold difference. The display controller processes subsequent second data representative of the second portion of the subsequent input frame to process the second portion of the subsequent input frame using the first image enhancement scheme, thereby generating subsequent second enhanced data. The subsequent second enhanced data is then sent to the display interface for sending to the display device. Hence, in this case, despite both the first and second portions of the subsequent input frame being similar to or the same as corresponding first and second portions of the input frame, only the second portion of the subsequent input frame is processed using the first image enhancement scheme in this case (as in this example the first image enhancement scheme produces a higher quality output than the second image enhancement scheme that was used to process the second portion of the input frame). Similarly, further portions of the subsequent input frame may be processed using a third image enhancement scheme that is less computationally intensive, and which produces a lower quality result, than both the first and second image enhancement scheme. In yet further frames, corresponding further portions may be processed with the first and/or second image enhancement schemes, until eventually data representing an entire output frame may have undergone processing using the first image enhancement scheme.

Figure 4:
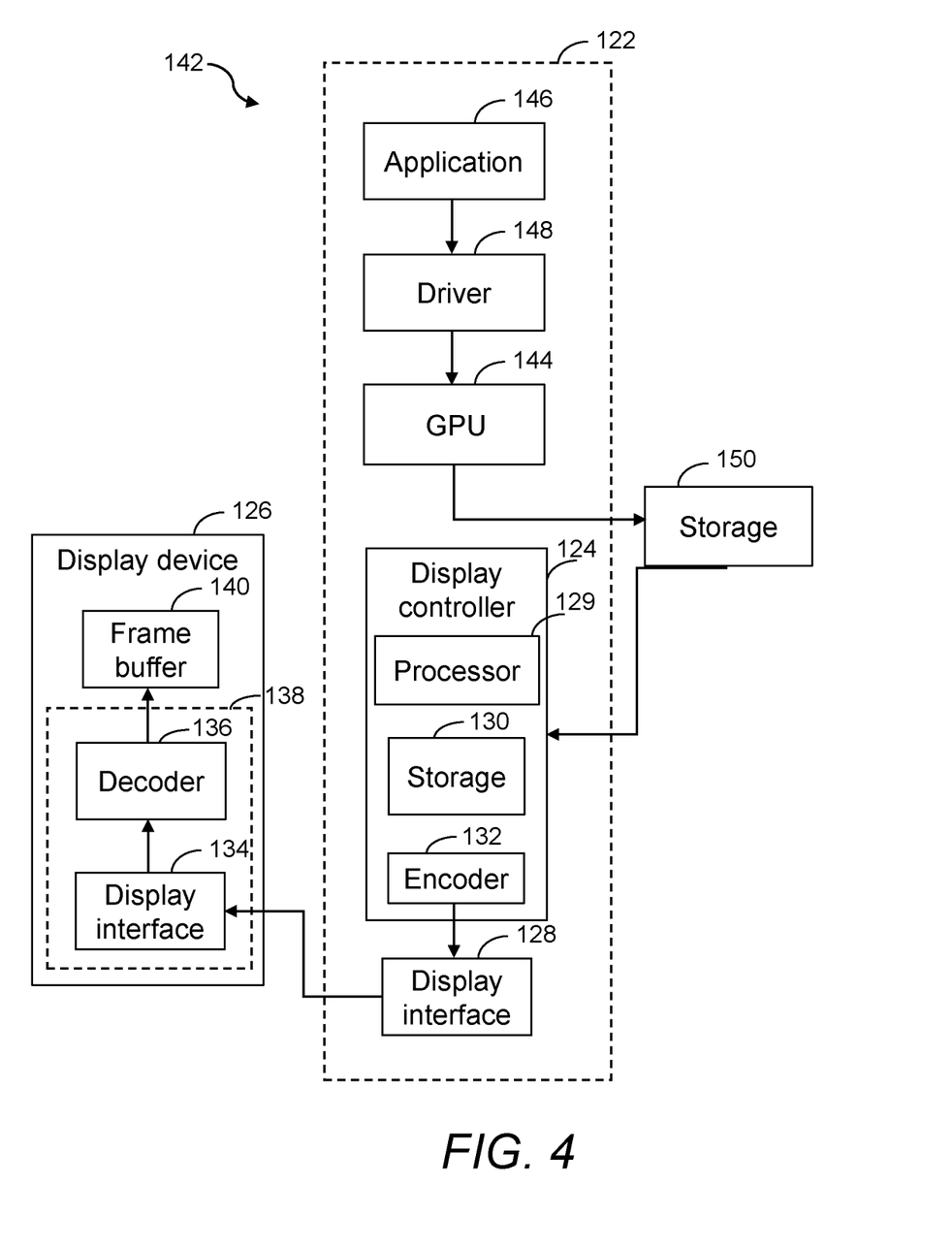
FIG. 4 is a schematic diagram illustrating features of an example computing device for use with the system of FIG. 3.

Further examples relate to a computing device comprising the display controller according to examples herein, such as the display controller 124 of FIG. 3. FIG. 4 illustrates features of an example computing device 142 for use with the system of FIG. 3. Features of FIG. 4 that are the same as corresponding features of FIG. 3 are labelled with the same reference numeral; corresponding descriptions are to be taken to apply.

The computing device 142 is for example any electronic device including a display controller 124. The computing device 142 may be or include, amongst others, a cell phone, i.e. a mobile phone, for example a smartphone, a tablet, laptop or personal computer, a personal digital assistant, a head-mounted display (HMD) for example for augmented reality (AR) or virtual reality (VR), as well as various other electronic devices such as a game console. In the example of FIG. 4, the display controller 124 of the computing device 142 is arranged to process at least part of an input frame generated as part of a graphics processing pipeline using an image enhancement scheme. However, this is merely an example, and in other cases, the display controller 124 may process at least part of an input frame generated by or obtained for a different purpose using the image enhancement scheme.

The computing device 124 includes a processor system 122. Components of the processor system 122 may be communicatively coupled via at least one bus, which may have a limited bandwidth. Operations performed by the processor components may be carried out by hardware and/or software. Each of the processor components may be implemented using machine readable instructions and suitably programmed or configured hardware, such as circuitry. Each of the processor components can include a microprocessor, microcontroller, processor module or subsystem, programmable integrated circuit, programmable gate array or other computing device. For example, the processor system 122 may form part of or include a system on a chip (SoC) arrangement. The processor components may comprise multiple co-located processors or multiple disparately located processors. In some examples, the processor system 122 comprises computer-useable volatile and/or non-volatile memory configured to store information and/or instructions for the processor components, which may be considered to correspond to local storage of the processor system 122 The computer-useable volatile and/or non-volatile memory may be coupled with the bus. The computer-useable memory may comprise random access memory (RANI) and/or read-only memory (ROM). In the example of FIG. 4, the processor system 122 includes a main processor of the computing device 142 (sometimes referred to as a central processing unit (CPU)), and a GPU 144. However, this is merely an example.

In FIG. 4, an application 146 (such as a game or other application for which graphics are to be generated) is executed using the processor system 122. The application 146 generates application programming interface (API) calls that are interpreted by a driver 148 for the GPU 144. The driver 148 is also executed using the processor system 122. The driver 148 generates appropriate commands to the GPU 144 to generate the graphics output requested by the application 146.

To generate the appropriate commands for the GPU 144, the driver 148 may request the use of data stored in a storage system 150 of the computing device 124. The storage system 150 may be a random access memory (RAM) such as DDR-SDRAM (double data rate synchronous dynamic random access memory). In other examples, the storage system 150 may be or include a non-volatile memory such as Read Only Memory (ROM) or Non-Volatile RAM (NVRAM), or a solid state drive (SSD) such as Flash memory. The storage system 150 in examples may include further storage devices, for example magnetic, optical or tape media, compact disc (CD), digital versatile disc (DVD) or other data storage media. The storage system 150 may be removable or non-removable from the computing device 142. In the example of FIG. 4, the storage system 150 is a main memory of the computing device 124, which may be referred to as a primary memory. The storage system 150 may be an external memory, in that the storage system 150 is external to the processing system 122. For example, the storage system 150 may include "off-chip" memory. The storage system 150 may have a greater storage capacity than storage of the processor system 122, which may be "on-chip" storage. Control of the flow of data between the processor system 122 and the storage system 150 may be controlled by a memory controller, which may include a dynamic memory controller (DMC).

The GPU 144 generates image data representative of an image for an input frame based on the instructions received from the driver 148 and stores the image data in the storage 150. The image data may represent the entire input frame or may represent part of the input frame (such as a window or layer, which is to be composited with at least one further window or layer to generate the input frame). The display controller 124 obtains first data representative of a first portion of the input frame and processes the first data using the image enhancement scheme, as discussed further with reference to FIGS. 1 to 3. The display controller 124 also obtains data representative of at least one further portion of the input frame from the storage 150 in FIG. 4. The data may be sent to the display interface 128 for sending to the display device 126 without being processed using an image enhancement scheme (such as the or a different image enhancement scheme). In such cases, the data corresponds to the further data associated with the at least one further portion of the input frame. In other cases, the data is processed by the display controller 124 to generate the further data for sending to the display interface 128 for sending to the display device 126.

The output frame, which includes a first portion represented by the first enhanced data generated by processing the first data using the image enhancement scheme and at least one further portion represented by the further data, is displayed on the display device 126. In the example of FIG. 4, the display device 126 forms part of the computing device 142, and is internally coupled to the computing device 124. For example, the display device 126 may be a display screen of a computing device 142 such as a smartphone; tablet, laptop or desktop computer; or personal digital assistant. Alternatively, the display device 126 may be an external device coupled to the computing device 142, for example a television screen or a computer monitor coupled to a laptop, desktop computer or game console via a High-Definition Multimedia Interface (HDMI) cable. The display device 126 may be any suitable display device such as a transmissive or transflective display device such as liquid crystal display (LCD) device, an electrowetting display device or an electrophoretic display device. Alternatively, the display device 126 may be a display device in which pixels or picture elements of the display device generate light, such as an organic light emitting diode (OLED) display device, a microLED display device, or a plasma display device. The display device 126 may be referred to as a display panel. Hence, sending data to the display device 126 may be considered to correspond to sending data to a display panel. The display device 126 may be integrated into a HMD.

As explained with reference to FIG. 3, the first enhanced data and at least one portion of the further data may be stored in local storage of the display device 124 (in this example, the framebuffer 140) prior to being displayed by the display device 124 (although this need not be the case in some examples). In FIG. 4, the application 146 is a game. Output frames of the game (or portions thereof) may be stored temporarily in the framebuffer 140 and displayed at an appropriate frame rate (which may differ from a rate at which the frames are rendered by the graphics processor 144). In examples herein, though, the output frame includes at least two portions that were received by the display device 126 at different respective times, due to the sequential transfer of data to the display interface 128 by the display controller 124 and from the display interface 128 to the display device 126.

The components of the computing device 142 in the example of FIG. 4 may be interconnected using a systems bus. This allows data to be transferred between the various components, for example between the processor system 122 and the storage system 150 or between the storage system 122 and the display controller 124. The computing device 142 may include additional appropriate interfaces to enable the transfer of data between the various different components, as the skilled person will appreciate. The computing device 142 of FIG. 4 may also include a network interface for receiving data, such as image data, from a server device. The network interface of the computing device 142 may include software and/or hardware components, such as a virtual network interface, an Ethernet port, a software driver and/or communications stack interacting with network hardware.

The above examples are to be understood as illustrative examples. Further examples are envisaged. In the example of FIG. 3, the display controller 124 includes an encoder 132 and the display device 126 includes a decoder 136. In other examples, the encoder 132 and decoder 136 may be omitted, or at least some data processed by the display controller 124 and sent to the display interface 128 for sending to the display device 126 need not undergo compression and decompression. For example, this may be the case where the data for transmission by the display interface 128 is relatively small in size, such as within a bandwidth limit for transfer of data by the display interface 128.

Figure 5:
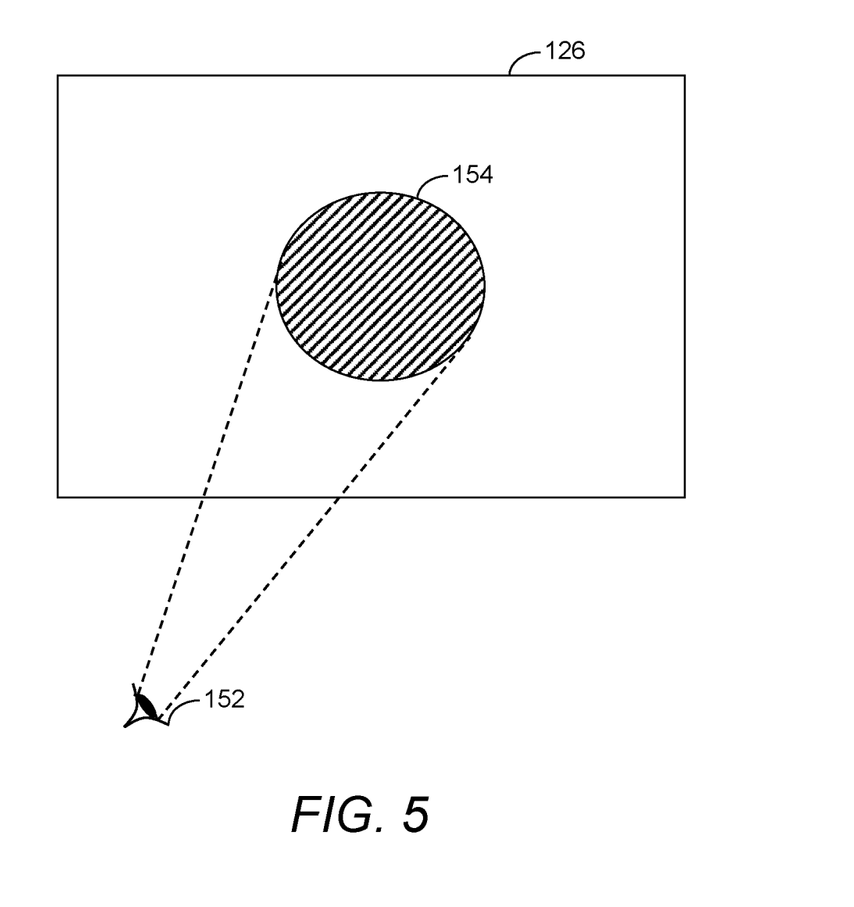
FIG. 5 is a schematic diagram illustrating display of an output frame using gaze tracking according to examples.

A further example is shown schematically in FIG. 5. In this example, the processing scheme and/or the compression ratio applied to a given portion of the input frame is further determined based on a gaze direction of a viewer of the display device 126 for displaying the output frame based on the input frame. In FIG. 5, the viewer 152 focuses on a target region 154 of the display device 126. As the attention of the viewer 152 is focused on the target region 154, reduced image quality will be less noticeable to the viewer 152 in other regions of the display device 126. Hence, to reduce processing demands, the image enhancement scheme may be performed for at least one portion of an input frame which is identified as being associated with a gaze direction of a viewer 152 (in this case, the first portion). Other portions of the input frame may not be processed using the or an image enhancement scheme. Similarly, a compression ratio of display interface compression may differ for portions of the input frame that are associated with the gaze direction and those portions that are not associated with the gaze direction. For example, the first portion may have a lower compression ratio than portions of the input frame that are not associated with the gaze direction, to maintain a display quality of the first portion.

The gaze direction of the viewer 152 may be determined using an eye-tracking device. An eye-tracking device may include one or more eye-tracking sensors configured to track eye movement and/or determine a gaze location and/or gaze direction of a viewer of an output frame. The eye-tracking device may be included in the display device 126 in some examples. For example, where the display device 126 comprises a head mounted display (HMD), e.g. for augmented reality (AR) or virtual reality (VR) applications, the eye-tracking device may form part of and/or be mounted upon the HMD. In other examples, though, the eye-tracking device is separate from the display device 126.

It is to be appreciated that the system 120 of FIG. 3 and the computing device 142 of FIG. 4 are necessarily simplified for ease of illustration. The system 120 and the computing device 142, and various components of the system 120 and/or computing device 142, may include further components not illustrated in FIGS. 3 and 4.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A display controller configured to:
process first data representative of a first portion of an input frame to process the first portion of the input frame using an image enhancement scheme, thereby generating first enhanced data;
send the first enhanced data to a display interface for sending to a display device; and
subsequently, send further data to the display interface for sending to the display device, wherein the further data is associated with at least one further portion of the input frame, and each of the at least one further portion is different from the first portion of the input frame,
wherein the display controller is further configured to send instructions to the display interface for sending to the display device to instruct the display device to display an output frame comprising a first portion represented by the first enhanced data and at least one further portion represented by the further data.

2. The display controller according to claim 1, wherein the display controller is configured to process second data representative of a second portion of the input frame to process the second portion of the input frame using the image enhancement scheme, subsequently to processing the first data, thereby generating second enhanced data, wherein the second portion of the input frame is different from the first portion of the input frame and the further data comprises the second enhanced data.

3. The display controller according to claim 1, wherein the display controller is configured to generate the first enhanced data and send the first enhanced data to the display interface without storing the first enhanced data in storage external to the display controller.

4. The display controller according to claim 1, wherein the first portion of the input frame includes a first portion of a row of the input frame and the at least one further portion of the input frame includes at least one further portion of the row of the input frame, such that the row of the input frame is formed by a combination of the first portion of the row and the at least one further portion of the row.

5. The display controller according to claim 1, wherein the display controller is configured to send the first enhanced data and the further data to the display interface for sending of the first enhanced data to the display device before sending of the further data to the display device.

6. The display controller according to claim 1, wherein the image enhancement scheme of the first portion of the input frame comprises processing the first portion of the input frame with a convolutional neural network (CNN) configured to receive an image portion of a given size as an input, and the first portion of the input frame is the given size.

7. The display controller according to claim 1, wherein the display controller is configured to compress the first enhanced data before sending the first enhanced data to the display interface.

8. The display controller according to claim 7, wherein the display controller is configured to:
  determine a compression ratio for the first enhanced data based on at least one of:
    a visual characteristic of the first portion of the input frame; or
    a bandwidth associated with transfer of data by the display interface to the display device and
  compress the first enhanced data with the compression ratio.

9. The display controller according to claim 1, wherein the further data comprises second data representative of a second portion of the input frame and the display controller is configured to at least one of:
  compress the first enhanced data with a first compression ratio and compress the second data with a second compression ratio different from the first compression ratio; or
  send the first enhanced data to the display interface with a first bit depth and send the second data to the display interface with a second bit depth, different from the first bit depth.

10. The display controller according to claim 1, wherein the display controller is configured to:
  process the first data using a first image enhancement scheme; and
  process second data representative of a second portion of the input frame using a second image enhancement scheme different from the first image enhancement scheme, thereby generating processed second data, wherein the second portion of the input frame is different from the first portion of the input frame and the further data comprises the processed second data.

11. The display controller according to claim 10, wherein an execution time for the second image enhancement scheme is less than an execution time for the first image enhancement scheme.

12. The display controller according to claim 10, wherein the display controller is configured to process the second data using the second image enhancement scheme in response to determining that an estimated resource consumption for processing the second portion of the input frame using the first image enhancement scheme meets or exceeds a threshold resource consumption.

13. The display controller according to claim 10, wherein the display controller is configured to process the second data using the second image enhancement scheme in response to determining that an average rate of sending enhanced data associated with a plurality of portions of the input frame to the display device, via the display interface, prior to processing the second data is less than a threshold rate, the enhanced data comprising the first enhanced data.

14. The display controller according to claim 10, wherein the processing the first data using the first image enhancement scheme comprises deep learning (DL) super-resolution (SR) image processing of the first portion of the input frame and the processing the second data using the second image enhancement scheme comprises upscaling the second portion of the input frame without using the DL SR image processing.

15. The display controller according to claim 10, wherein the display controller is configured to determine, based on at least one of a first visual characteristic of the first portion of the input frame or a second visual characteristic of the second portion of the input frame, that the first image enhancement scheme is to be used for the first portion of the input frame and that the second image enhancement scheme is to be used for the second portion of the input frame.

16. The display controller according to claim 10, wherein at least one of:
  the first portion of the input frame includes a foreground of the input frame and the second portion of the input frame includes a background of the input frame; or
  the first portion of the input frame includes a more central portion of the input frame than the second portion of the input frame, and the display controller is configured to:
    identify a second portion of a subsequent input frame that corresponds to the second portion of the input frame;
    determine that a difference between the second portion of the input frame and the second portion of the subsequent input frame is less than a threshold difference;
    process subsequent second data representative of the second portion of the subsequent input frame to process the second portion of the subsequent input frame using the first image enhancement scheme, thereby generating subsequent second enhanced data; and
    send the subsequent second enhanced data to the display interface for sending to the display device.

17. The display controller according to claim 1, wherein the display controller is configured to:
  identify a first portion of a subsequent input frame that corresponds to the first portion of the input frame;
  process the first data and subsequent first data representative of the first portion of the subsequent input frame to determine a difference between the first portion of the input frame and the first portion of the subsequent input frame; and
  based on the difference, determine whether to process the first portion of the subsequent input frame using the image enhancement scheme.

18. The display controller according to claim 17, wherein the display controller is configured to:
  determine that the difference meets or exceeds a threshold difference; and
  process the subsequent first data to perform upscaling of the first portion of the subsequent input frame without using the image enhancement scheme.

19. The display controller according to claim 1, wherein the first portion of the input frame is associated with a gaze direction of a viewer of the display device.

20. A method comprising:
  processing first data representative of a first portion of an input frame to process the first portion of the input frame using an image enhancement scheme, thereby generating first enhanced data;
  sending the first enhanced data to a display interface for sending to a display device;
  subsequently, sending further data to the display interface for sending to the display device, wherein the further data is associated with at least one further portion of the input frame, and each of the at least one further portion is different from the first portion of the input frame; and sending instructions to the display interface for sending to the display device to instruct the display device to display an output frame comprising a first portion represented by the first enhanced data and at least one further portion represented by the further data.

\* \* \* \* \*